O. H. WISENANT.
AIRPLANE.
APPLICATION FILED JULY 18, 1917.

1,290,857.

Patented Jan. 7, 1919.
5 SHEETS—SHEET 1.

Witnesses

Inventor
Oscar H. Wisenant
By Victor J. Evans
Attorney

O. H. WISENANT.
AIRPLANE.
APPLICATION FILED JULY 18, 1917.

1,290,857.

Patented Jan. 7, 1919.
5 SHEETS—SHEET 3.

WITNESSES
H. H. Lybrand
Rex Smith

INVENTOR
Oscar H. Wisenant
BY Victor J. Evans
ATTORNEY

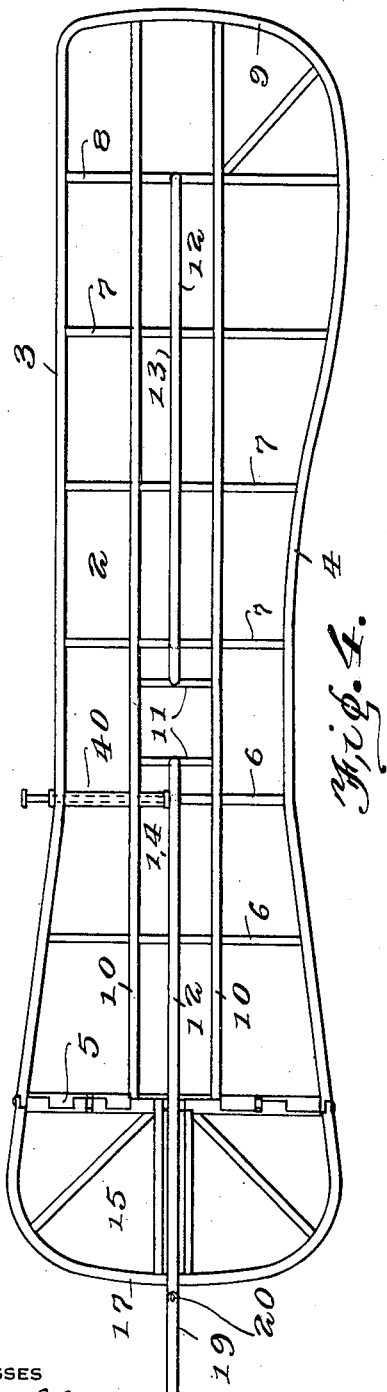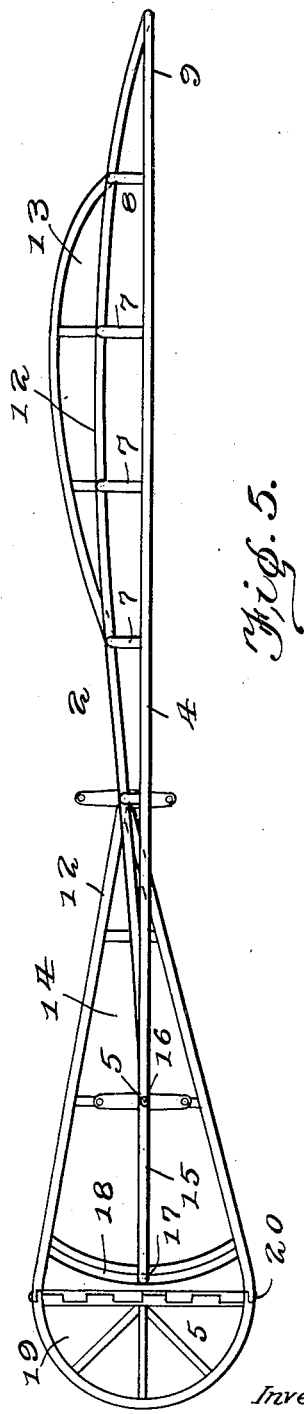

O. H. WISENANT.
AIRPLANE.
APPLICATION FILED JULY 18, 1917.
1,290,857.
Patented Jan. 7, 1919.
5 SHEETS—SHEET 5.
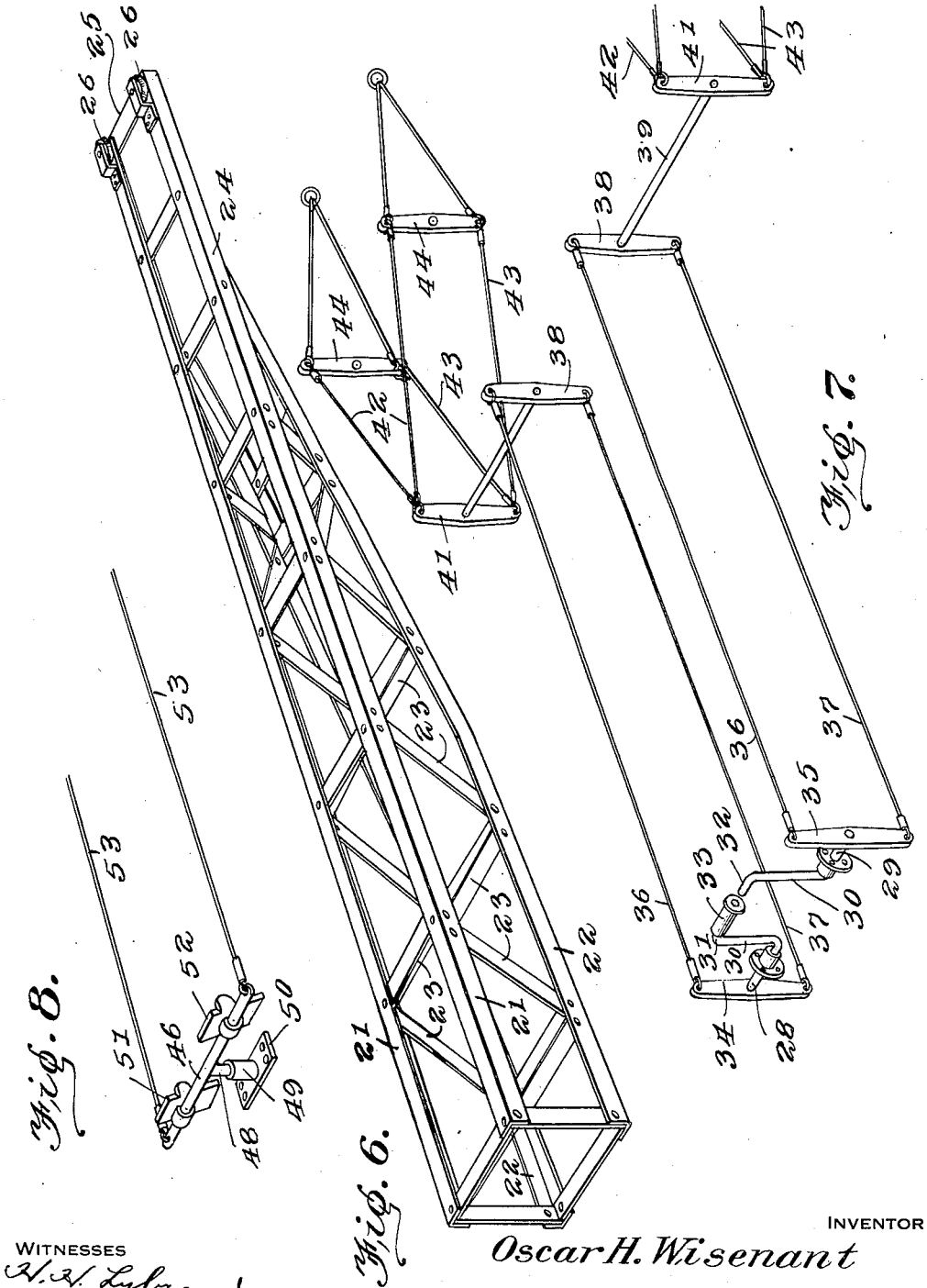
INVENTOR
Oscar H. Wisenant
BY Victor J. Evans
ATTORNEY
WITNESSES

UNITED STATES PATENT OFFICE.

OSCAR H. WISENANT, OF ROCHESTER, NEW YORK.

AIRPLANE.

1,290,857.   Specification of Letters Patent.   Patented Jan. 7, 1919.

Application filed July 18, 1917. Serial No. 181,320.

*To all whom it may concern:*

Be it known that I, OSCAR H. WISENANT, a citizen of the United States, residing at Rochester, in the county of Monroe and State of New York, have invented new and useful Improvements in Airplanes, of which the following is a specification.

This invention relates to airplanes or flying machines of the heavier than air type and the object of the invention is to produce an airplane embodying novel control mechanism by means of which the machine may be steered either by using the ordinary vertical rudder or by bringing into action a pair of horizontal rudders arranged at opposite sides of the fore and aft longitudinal center of the machine, by rocking said horizontal rudders simultaneously in opposite directions, elevating one and depressing the other. Both the vertical and horizontal rudders may thus be used independently or simultaneously for steering the machine and circling to the right or to the left.

Another object of the invention is to provide individual controlling means for each of the horizontal rudders hereinabove referred to, combined with means for coupling and uncoupling said controls, thus enabling the aviator to simultaneously elevate and depress both horizontal rudders or elevate and depress them independently of each other.

A further object of the invention is to provide in conjunction with a centrally arranged body, supporting wings or planes arranged at each side of the body and having their longitudinal axes parallel to the longitudinal axis of the body, the said supporting planes or wings being of novel formation and embodying fore and aft pressure balancing portions or fins, said fins serving to check side drift while at the same time adding to the stability of the machine.

With the above and other objects in view, the invention consists in the novel construction, combination and arrangement of parts, herein fully described, illustrated and claimed.

In the accompanying drawings:—

Fig. 4 is a plan view of one of the supporting planes with the covering removed to show the internal construction thereof;

Fig. 5 is a side elevation of one of the planes on an enlarged scale and partly in section;

Fig. 6 is a perspective view of the frame of the body;

Fig. 7 is a perspective view illustrating the horizontal rudder controlling means;

Fig. 8 is a similar view of the vertical rudder controlling means;

Fig. 9 is a fragmentary plan view on an enlarged scale showing the engine and propellers and the driving mechanism; and Fig. 10 is a fragmentary vertical longitudinal section on the line 10—10 of Fig. 9.

Figure 1:
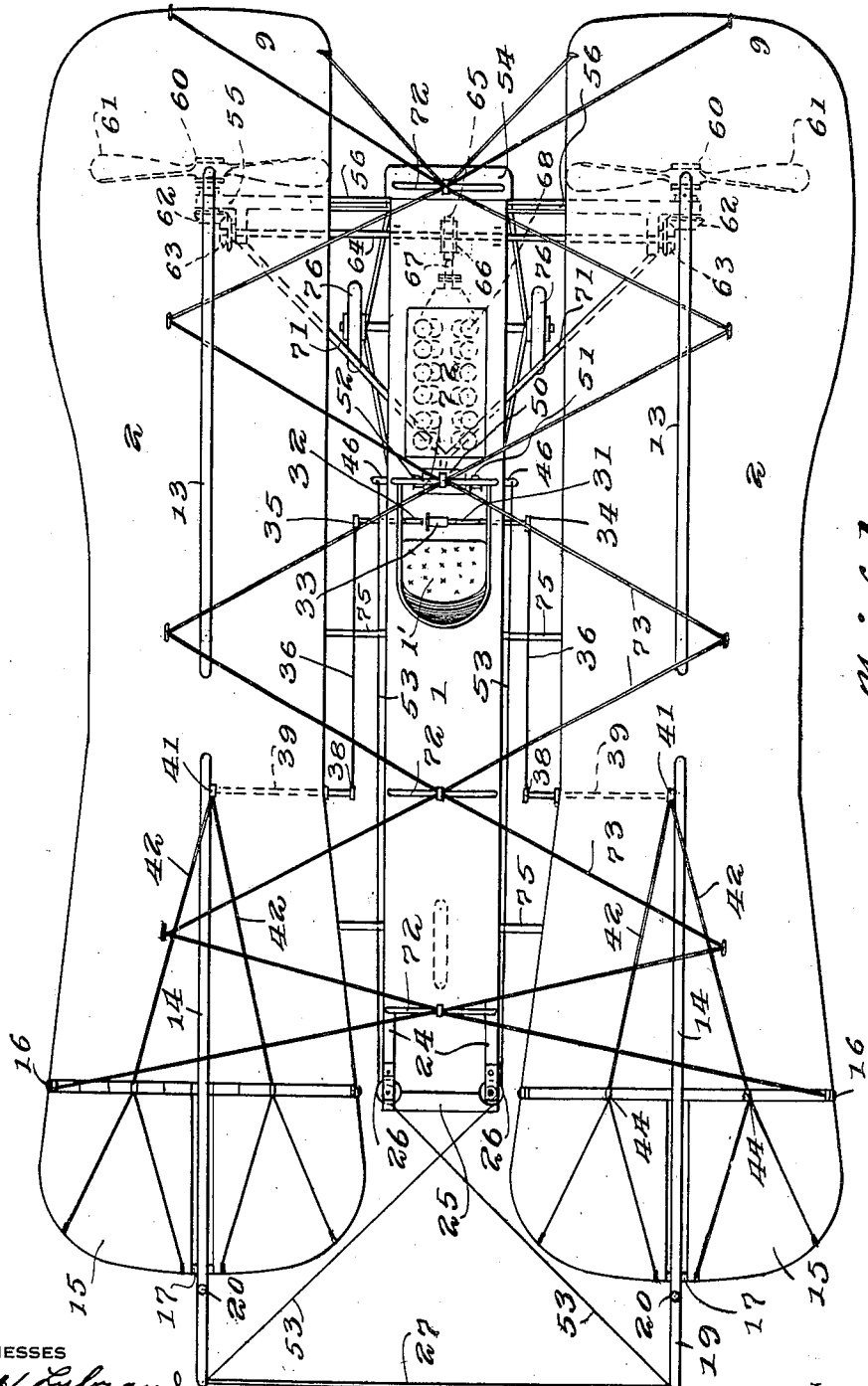
Figure 1 is a plan view of an airplane embodying the present invention.

The airplane contemplated in this invention comprises a body 1 which is longitudinally elongated in a fore and aft direction as clearly indicated in Fig. 1, and having arranged at opposite sides thereof the main supporting or elevating planes 2 each of which is also elongated in a fore and aft direction, the longitudinal axes of the planes 2 being parallel to each other and to the longitudinal axis of the body 1.

Figure 2:
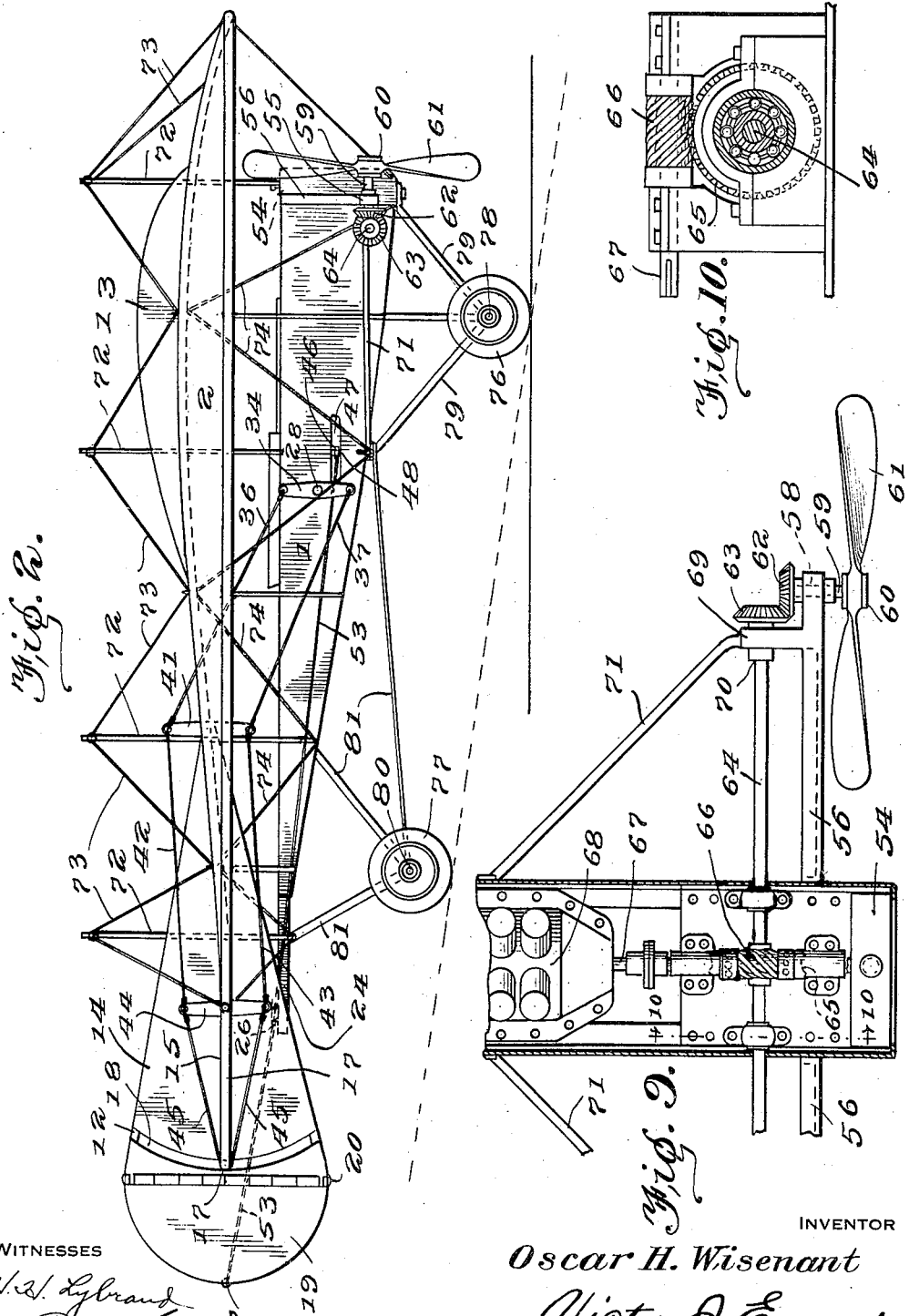
Fig. 2 is a side elevation of the same.

Each of the planes 2, as shown in Fig. 4, comprises an inner longitudinal frame bar 3 of any suitable material such as metal tubing or wood, an outer frame bar 4, and a plurality of cross bars 5, 6, 7 and 8 as well as a forward bow 9 thus giving to each plane 2 an arcuate leading edge. Parallel longitudinal bars 10 extend from the rear cross bar 5 to the front bow 9 and are arranged in spaced relation to each other as shown in Fig. 4. The bars 10 are in turn connected by interposed cross bars 11 which form the supports for the inner adjacent ends of the frame bars 12 of a forwardly located vertical fin 13 and a rearwardly located vertical fin 14. The forward fin 13 is preferably located wholly on the upper side of the plane while the fin 14 projects both above and below the plane as illustrated in Figs. 2 and 5.

Each plane 2 is also curved in a fore and aft direction or given a camber necessary to produce the elevating effect. The frame of each plane 2 and the frames of the fins 13 and 14 are covered with any suitable fabric tightly stretched over the same as in the present day airplane practice. The fins 13 and 14 prevent lateral or side drift of the machine while at the same time preventing what is known as side slipping, thereby adding materially to the inherent stability of the machine.

Attached to the rear end of each of the planes 2 is a horizontal rudder 15 the same being connected by a hinge pin 16 to the rear end cross bar 5 of the plane. Each horizontal rudder 15 comprises 2 quadrantal shaped sections arranged at opposite sides of the fin 14, the bow 17 forming the trailing edge of the horizontal rudder extending through an arcuate slot 18 formed in the vertical fin 14 and described on the arc of a circle of which the hinge pin 16 is the center. A vertical rudder 19 is connected by a vertical hinge pin 20 to the rear or trailing edge of the fin 14 and under the arrangement shown and described it will now be seen that there can be no interference between the vertical and horizontal rudders both of which are free at all times to be controlled by the aviator by the means hereinafter described.

The body 1 of the machine is preferably square or rectangular in cross section, comprising the longitudinal frame members 21 and 22, the members 22 converging rearwardly toward the upper members 21 as shown in Fig. 6 and all of the members 21 and 22 being connected by reversely inclined braces 23 forming a bridge-like structure. The members 21 and 22 are of angle iron formation as indicated in Fig. 6 but they may be composed of wood or other material if so desired. The outriggers 24 extend from the rear end of the body and are connected by a cross bar 25 and have mounted thereon guide pulleys 26 around which pass the flexible connections or cables which control the vertical rudders. It is to be understood that there are two vertical rudders 19, one for each plane 2 and said vertical rudders are connected for simultaneous movement by means of a coupling or connecting rod 27.

The means for controlling the fore and aft stability of the machine will now be described. Located in front of the aviator's seat 1' located within the body 1 is a pair of crank shafts 28 and 29 journaled in bearings supported by the body. Each of said shafts 28 and 29 is formed with a crank arm 30 and said crank arms are formed with inwardly extending handles 31 and 32 adapted to be coupled together or uncoupled from each other by means of a coupling sleeve 33 slidably mounted on one of the handles 31 and of sufficient length to slip over and engage the other handle so that both handles may be simultaneously operated, causing an equal and simultaneous elevation or depression of the horizontal rudders 15. The shaft 28 extends through the side of the body and has fast thereon outside of the body a two-armed lever or cross head 34, the other shaft 29 being similarly provided with a two-armed lever or cross head 35. Connections 36 and 37 extend from the lever 34 rearwardly to a similar lever 38 mounted fast on a rock shaft 39 extending transversely of the machine and journaled in a bearing sleeve 40 (see Fig. 4). The lever 38 is located at one end of the shaft 39 while a similar lever 41 is fast on the opposite end of said shaft. From the lever 41, rearwardly diverging wires 42 and 43 extend to their two-armed levers 44 having a fixed relation to the adjacent horizontal rudder 15 and from the extremities of the levers 44, stays 45 extend to the trailing edge of said horizontal rudder. The horizontal rudder controlling means just described, applies to both of the horizontal rudders. By shifting the coupling sleeve 33 so as to engage both handles 31 and 32, and by moving said handles with the aid of the coupling 33, the horizontal rudders may be simultaneously and equally elevated or depressed for the purpose of directing the machine upwardly or downwardly. By shifting the sleeve 33 so as to disconnect the handles 31 and 32, the rock shafts 28 and 29 may be actuated independently of each other. This enables the operator to depress one horizontal rudder and simultaneously elevate the other horizontal rudder. In this way the machine may be banked so as to describe a curved path, enabling the machine to be steered independently of the vertical rudder.

The means for controlling the vertical rudder will now be described. Arranged in front of the driver's seat is a pedal bar 46 extending transversely of the machine and passing through slots 47 extending longitudinally of the opposite sides of the body of the machine. Centrally the bar 46 is provided with a depending pivot post 48 which is received in a bearing 49 having a base flange 50 by which it is secured to the floor of the vehicle. Secured to the bar 45 at opposite sides of the center thereof are pedals 51 and 52 against which the aviator places his feet. Attached to the opposite extremities of the bar 46 and extending rearwardly therefrom are flexible connections 53. The connections 53 pass around the guide pulleys 26 above referred to and in rear thereof said connections 53 are crossed and attached at their rear extremities to the trailing edges of the vertical rudders 19. By pressing on one of the pedals 51, 52, the aviator may thus swing the vertical rudders in unison so as to direct the machine to the right or to left.

Located at the extreme forward end of the body 1 is a radiator 54 projecting from the opposite sides of which are triangular frames each comprising a lower horizontal member 55 and inclined bracing members 56, the frame formed by the bars 55 and 56 extending transversely of the machine. The bars 55 and 56 are connected at their extremities and formed with enlarged ears 57 having bearings 58 of the radial ball bearing type for a pair of propeller shafts 59, each shaft 59 having a flange 60 to which one of a pair of propellers 61 is bolted or otherwise fastened. The propeller shafts 59 extend through the bearings 58 and have fast thereon bevel gears 62 which mesh with other bevel gears 63 on a shaft 64 extending transversely of the machine and at right angles to the propeller shafts 59. Located centrally of the shaft 64 and fast thereon is a worm gear 65 which meshes with and is actuated by a worm 66 on an extension shaft 67 of the crank shaft of an internal combustion engine 68 mounted within the body 1. The frames at opposite sides of the radiator are formed on their sides with arms or brackets 69 (see Fig. 9) containing bearings 70 for the shaft 64. Braces 71 extend from outer sides of the engine 68 to the opposite ends of the frames as shown in Fig. 9. All of the shafts and gears hereinabove just described and shown in Figs. 9 and 10 may be inclosed in a suitable oil tight housing, enabling the working parts to run in oil or other lubricating material.

Figure 3:
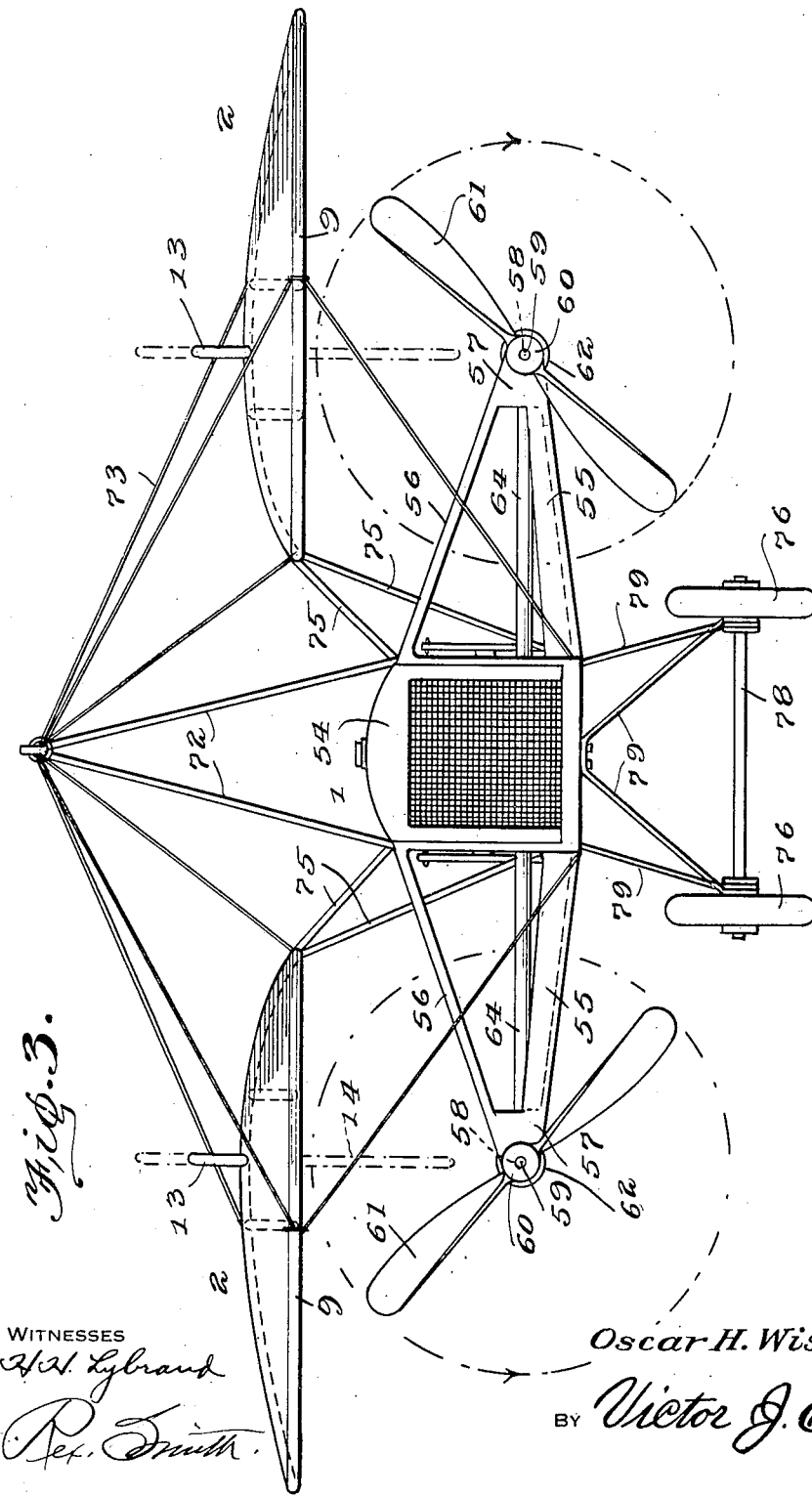
Fig. 3 is a front elevation thereof.

The means for bracing the wings or supporting planes 2 of the machine, comprises a fore and aft series of inverted V-shaped masts 72 the lower extremities of which are fastened securely to opposite sides of the body 1. Stays 73 extend from the tops of the masts 72 to the outer lateral edges of the planes 2 and other stays 74 extend from said planes to the bottom of the body 1 as shown in the front elevation Fig. 3. The wings are fastened to inclined upwardly converging supports 75 of tubing or other suitable material extending from the body 1 to the inner bars 3 of the supporting planes or wings 2.

From the foregoing description taken in connection with the accompanying drawings, it will be seen that I have produced an airplane which is thoroughly braced, and which is exceedingly compact as far as the lateral dimensions or spread thereof is concerned. It will be observed that I employ tractor propellers, one for each of the supporting planes and located beneath and adjacent to the leading edges thereof so as to direct blasts of air rearwardly under the bottom surface of said planes, thus insuring against the drooping of the rear portions of the supporting planes, maintaining the machine on an even fore and aft keel when the horizontal rudders are disposed for that purpose. It will also be seen that by means of the fins, under the arrangement described and shown, the lateral stability of the machine is materially increased, side slipping prevented, and side pressure of air currents are equalized at the front and rear of the machine causing the same to adhere to the course in which it is directed by the vertical rudders. It will further be seen that by employing two horizontal rudders capable of being independently operated, the lateral equilibrium of the machine may be preserved or restored and the said horizontal rudders may also be used for directional purposes either in conjunction with or independently of the vertical rudders. This gives unusual control of the machine, producing what is known as a double factor of safety and control.

The rear portions of the main supporting planes are of fantail shape as shown and the forward portions of the planes progressively increase in width toward the leading edges thereof, giving additional supporting surface.

The machine is shown as comprising a wheel base embodying front wheels 76 and rear wheels 77. The front wheels are mounted on an axle 78 carried by V-shaped braces 79 connected to the body 1 of the machine, and the rear wheels 77 are mounted on an axle 80 carried by braces 81 also connected to the body 1. It will of course be understood that a water base of suitable formation may be substituted for the wheel base herein shown, without departing from the principle or sacrificing any of the advantages of the invention.

I claim:—

1. In an airplane, the combination of a body, supporting planes arranged at opposite sides of said body and having their longitudinal axes substantially parallel to each other and to the body, a horizontal rudder at the rear end of each of said planes, means for operating said horizontal rudders comprising a pair of rock shafts journaled in the body, operative connections between said rock shafts and horizontal rudders, said rock shafts being independently operable to enable said horizontal rudders to be independently controlled, and coupling means for connecting said rock shafts causing them to move in unison for simultaneously and equally elevating and depressing said rudders.

2. In an airplane, the combination of a body, supporting planes secured thereto at opposite sides thereof and having their longitudinal axes substantially parallel to each other and to said body, a horizontal rudder at the rear end of each of said planes, controlling means for said horizontal rudders, a vertical rudder at the rear end of each of said planes, a yoke bar connecting said vertical rudders, and controlling means whereby said vertical rudders may be simultaneously swung in the same direction.

3. In an airplane, the combination of a body, supporting planes attached thereto at opposite sides thereof and having their longitudinal axes substantially parallel to each other and to the body, a horizontal rudder and a vertical rudder at the rear end of each of said planes, controlling means for said rudders, vertical longitudinal fins extending along the upper sides and forward portions of said planes, and other vertical longitudinal fins extending along the rear portions and the upper and lower sides of said planes, the last named fins having the vertical rudders attached thereto and being formed with arcuate slots to receive the controlling edge frames of the horizontal rudders.

4. In an airplane, the combination of a body, supporting planes arranged at opposite sides thereof, and attached thereto and having their longitudinal axes substantially parallel to each other and to the body, lateral balancing rudders attached to the rear ends of said planes, vertical rudders arranged at the rear ends of said planes, an engine mounted in the body, a shaft extending transversely of the body at the forward end thereof, and geared to said engine, a frame supporting said shaft, and propeller shafts journaled in the opposite ends of said frame and geared to the aforesaid shaft to rotate in opposite directions.

5. In an airplane, the combination of a body, supporting planes arranged at opposite sides thereof, and attached thereto and having their longitudinal axes substantially parallel to each other and to the body, lateral balancing rudders attached to the rear ends of said planes, vertical rudders arranged at the rear ends of said planes, an engine mounted in the body, a shaft extending transversely of the body at the forward end thereof and geared to said engine, a frame supporting said shaft, propeller shafts journaled in the opposite ends of said frame and geared to the aforesaid shaft to rotate in opposite directions, the driving connections between the first named shaft and the engine shaft embodying a worm having a fixed relation to the engine shaft, and a worm gear on said first named shaft meshing with and driven by said worm.

6. In an airplane, the combination of a body, supporting planes arranged at opposite sides thereof, and attached thereto and having their longitudinal axes substantially parallel to each other and to the body, lateral balancing rudders attached to the rear ends of said planes, vertical rudders arranged at the rear ends of said planes, an engine mounted in the body, a shaft extending transversely of the body at the forward end thereof and geared to said engine, a radiator, frames extending from opposite sides of said radiator and supporting said shaft, and propeller shafts journaled in the ends of said frames and geared to the aforesaid shaft to rotate in opposite directions.

In testimony whereof I affix my signature.

OSCAR H. WISENANT.